(12) United States Patent
Moliton et al.

(10) Patent No.: US 8,896,675 B2
(45) Date of Patent: Nov. 25, 2014

(54) DISPLAY SYSTEM FOR STEREOSCOPIC VIEWING IMPLEMENTING SOFTWARE FOR OPTIMIZATION OF THE SYSTEM

(75) Inventors: Renaud Moliton, Charenton-le-Pont (FR); Cécile Bonafos, legal representative, Paris (FR); Cédric Buchon, Charenton le Pont (FR); Benjamin Rousseau, Charenton le Pont (FR); Sarah Marie, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 1418 days.

(21) Appl. No.: 12/311,435

(22) PCT Filed: Apr. 10, 2007

(86) PCT No.: PCT/FR2007/052077
§ 371 (c)(1),
(2), (4) Date: Mar. 26, 2009

(87) PCT Pub. No.: WO2008/040918
PCT Pub. Date: Apr. 10, 2008

(65) Prior Publication Data
US 2011/0102558 A1      May 5, 2011

(30) Foreign Application Priority Data

Oct. 5, 2006 (FR) ...................................... 06 54111

(51) Int. Cl.
*G02B 23/00*        (2006.01)
*G02B 27/14*        (2006.01)
(Continued)

(52) U.S. Cl.
CPC .... *H04N 13/0022* (2013.01); *G02B 2027/0134* (2013.01); *H04N 2213/002* (2013.01);
(Continued)

(58) Field of Classification Search
CPC ............ H04N 13/022; H04N 13/0497; H04N 13/044; H04N 13/0018; H04N 13/0051; H04N 13/0055; H04N 13/0296; H04N 2213/002; G02B 7/12; G02B 2027/014; G02B 2027/0134
USPC ............. 348/54, 43, 53; 345/7; 359/411, 412, 359/473, 630; 382/154
See application file for complete search history.

(56) References Cited

U.S. PATENT DOCUMENTS 2,715,852 A * 8/1955 Ellis .............................. 351/201
4,757,378 A * 7/1988 Hackett et al. .................. 348/42
(Continued)

OTHER PUBLICATIONS

International Search Report dated Apr. 8, 2008.

*Primary Examiner* — Daniel C Murray
(74) *Attorney, Agent, or Firm* — Sofer & Haroun, LLP

(57) ABSTRACT

The present invention relates to a display system for stereoscopic viewing, the system comprising a binocular viewing device, information content, and a display source. The display system is remarkable in that it further comprises electronic components for implementing pieces of software for optimizing the binocular viewing device, the information content, and the display source, said pieces of optimization software together forming a loop for managing various parameters. The wearer of said device can thus view the information content via the binocular viewing device under conditions that are best adapted to the wearer's physiology.

13 Claims, 5 Drawing Sheets

(51) Int. Cl.
*G02B 27/22* (2006.01)
*G06K 9/00* (2006.01)
*G09G 5/00* (2006.01)
*H04N 13/00* (2006.01)
*H04N 13/04* (2006.01)
*H04N 13/02* (2006.01)
*G02B 27/01* (2006.01)
*G02B 7/12* (2006.01)

(52) U.S. Cl.
CPC ...... *G02B 2027/014* (2013.01); *H04N 13/0018* (2013.01); *G02B 7/12* (2013.01); *H04N 13/0296* (2013.01); *H04N 13/0051* (2013.01); *H04N 13/0055* (2013.01); *H04N 13/0497* (2013.01); *H04N 13/044* (2013.01)
USPC ...... 348/53; 345/7; 348/43; 348/54; 359/411; 359/412; 359/473; 359/630; 382/154

(56) References Cited

U.S. PATENT DOCUMENTS

| | | | | |
|---|---|---|---|---|
| 4,994,794 A * | 2/1991 | Price et al. | | 345/7 |
| 5,034,809 A * | 7/1991 | Katoh | | 348/53 |
| 5,276,471 A * | 1/1994 | Yamauchi et al. | | 351/153 |
| 5,388,990 A * | 2/1995 | Beckman | | 434/38 |
| 5,467,104 A * | 11/1995 | Furness et al. | | 345/8 |
| 5,534,689 A * | 7/1996 | Barbier et al. | | 250/206.2 |
| 5,539,422 A * | 7/1996 | Heacock et al. | | 345/8 |
| 5,543,816 A * | 8/1996 | Heacock | | 345/8 |
| 5,583,795 A * | 12/1996 | Smyth | | 702/150 |
| 5,659,327 A * | 8/1997 | Furness et al. | | 345/8 |
| 5,708,449 A * | 1/1998 | Heacock et al. | | 345/8 |
| 5,739,797 A * | 4/1998 | Karasawa et al. | | 345/8 |
| 5,751,476 A * | 5/1998 | Matsui et al. | | 359/411 |
| 5,767,820 A * | 6/1998 | Bassett et al. | | 345/8 |
| 5,801,760 A * | 9/1998 | Uomori | | 348/47 |
| 5,825,340 A * | 10/1998 | Torizuka et al. | | 345/8 |
| 5,825,539 A * | 10/1998 | Hoshi | | 359/462 |
| 5,880,773 A * | 3/1999 | Suzuki | | 348/115 |
| 5,936,663 A * | 8/1999 | Tabata et al. | | 348/51 |
| 6,084,555 A * | 7/2000 | Mizoguchi et al. | | 345/8 |
| 6,198,484 B1 * | 3/2001 | Kameyama | | 345/419 |
| 6,201,517 B1 * | 3/2001 | Sato | | 345/7 |
| 6,232,934 B1 * | 5/2001 | Heacock et al. | | 345/8 |
| 6,310,982 B1 * | 10/2001 | Allred et al. | | 382/260 |
| 6,400,418 B1 * | 6/2002 | Wakabayashi | | 348/707 |
| 6,480,174 B1 * | 11/2002 | Kaufmann et al. | | 345/8 |
| 6,683,584 B2 * | 1/2004 | Ronzani et al. | | 345/8 |
| 6,822,623 B2 * | 11/2004 | Kim et al. | | 345/8 |
| 6,879,443 B2 * | 4/2005 | Spitzer et al. | | 359/630 |
| 6,963,454 B1 * | 11/2005 | Martins et al. | | 359/630 |
| 7,068,242 B2 * | 6/2006 | Kiyokawa | | 345/8 |
| 7,103,212 B2 * | 9/2006 | Hager et al. | | 382/154 |
| 7,193,584 B2 * | 3/2007 | Lee | | 345/7 |
| 7,229,174 B2 * | 6/2007 | Hakkinen | | 351/204 |
| 7,346,174 B1 * | 3/2008 | Smith | | 381/67 |
| 7,372,987 B2 * | 5/2008 | Tokuhashi et al. | | 382/154 |
| 7,457,041 B2 * | 11/2008 | Tsan et al. | | 359/630 |
| 7,488,076 B2 * | 2/2009 | Era | | 353/7 |
| 7,511,684 B2 * | 3/2009 | Oliver et al. | | 345/8 |
| 7,573,525 B2 * | 8/2009 | Yamasaki | | 348/345 |
| 7,924,503 B2 * | 4/2011 | Buchon et al. | | 359/412 |
| 8,040,600 B2 * | 10/2011 | Pombo | | 359/412 |
| 8,102,413 B2 * | 1/2012 | Mehrle | | 348/42 |
| 8,320,623 B2 * | 11/2012 | Cleveland | | 382/103 |
| 8,564,647 B2 * | 10/2013 | Tin | | 348/51 |
| 8,570,242 B2 * | 10/2013 | Chosokabe et al. | | 345/7 |
| 8,630,480 B2 * | 1/2014 | Takahashi et al. | | 382/154 |
| 8,668,334 B2 * | 3/2014 | Krenik | | 351/205 |
| 8,766,973 B2 * | 7/2014 | Thorpe | | 345/419 |
| 2002/0034004 A1 * | 3/2002 | Khoshnevis et al. | | 359/407 |
| 2002/0057228 A1 * | 5/2002 | Fateh et al. | | 345/7 |
| 2003/0184860 A1 * | 10/2003 | Hakkinen | | 359/480 |
| 2004/0145655 A1 * | 7/2004 | Tomita | | 348/51 |
| 2004/0208357 A1 * | 10/2004 | Tokuhashi et al. | | 382/154 |
| 2004/0212776 A1 * | 10/2004 | Spitzer et al. | | 351/41 |
| 2004/0238732 A1 * | 12/2004 | State et al. | | 250/250 |
| 2005/0174470 A1 * | 8/2005 | Yamasaki | | 348/345 |
| 2005/0174651 A1 * | 8/2005 | Spitzer et al. | | 359/630 |
| 2005/0271303 A1 * | 12/2005 | Simpson | | 382/305 |
| 2006/0072206 A1 * | 4/2006 | Tsuyuki et al. | | 359/631 |
| 2006/0168859 A1 * | 8/2006 | Pombo et al. | | 40/611.07 |
| 2006/0290778 A1 * | 12/2006 | Kitaura et al. | | 348/51 |
| 2007/0153374 A1 * | 7/2007 | Travers | | 359/412 |
| 2007/0165305 A1 * | 7/2007 | Mehrle | | 359/464 |
| 2007/0200927 A1 * | 8/2007 | Krenik | | 348/47 |
| 2007/0211227 A1 * | 9/2007 | Era | | 353/99 |
| 2007/0285795 A1 * | 12/2007 | Tsan et al. | | 359/630 |
| 2008/0024391 A1 * | 1/2008 | Oliver et al. | | 345/8 |
| 2008/0042038 A1 * | 2/2008 | Pombo | | 248/544 |
| 2008/0180521 A1 * | 7/2008 | Ahearn | | 348/42 |
| 2008/0298603 A1 * | 12/2008 | Smith | | 381/67 |
| 2009/0109513 A1 * | 4/2009 | Bostaph | | 359/228 |
| 2009/0284584 A1 * | 11/2009 | Wakabayashi et al. | | 348/44 |
| 2010/0033554 A1 * | 2/2010 | Kobayashi | | 348/43 |
| 2010/0039504 A1 * | 2/2010 | Takahashi et al. | | 348/54 |
| 2010/0060551 A1 * | 3/2010 | Sugiyama et al. | | 345/8 |
| 2010/0060723 A1 * | 3/2010 | Kimura et al. | | 348/56 |
| 2010/0103077 A1 * | 4/2010 | Sugiyama et al. | | 345/8 |
| 2010/0110368 A1 * | 5/2010 | Chaum | | 351/158 |
| 2010/0177168 A1 * | 7/2010 | Hu | | 348/47 |
| 2010/0232016 A1 * | 9/2010 | Landa et al. | | 359/466 |
| 2010/0289880 A1 * | 11/2010 | Moliton et al. | | 348/47 |
| 2011/0157327 A1 * | 6/2011 | Seshadri et al. | | 348/51 |
| 2011/0248905 A1 * | 10/2011 | Chosokabe et al. | | 345/7 |
| 2012/0133747 A1 * | 5/2012 | Takahashi et al. | | 348/51 |
| 2012/0154277 A1 * | 6/2012 | Bar-Zeev et al. | | 345/158 |
| 2012/0212499 A1 * | 8/2012 | Haddick et al. | | 345/589 |
| 2012/0218301 A1 * | 8/2012 | Miller | | 345/633 |
| 2012/0249797 A1 * | 10/2012 | Haddick et al. | | 348/158 |
| 2013/0120536 A1 * | 5/2013 | Song et al. | | 348/46 |
| 2013/0222548 A1 * | 8/2013 | Yang et al. | | 348/47 |
| 2013/0251241 A1 * | 9/2013 | Kunkel et al. | | 382/154 |
| 2014/0022284 A1 * | 1/2014 | Chosokabe et al. | | 345/633 |
| 2014/0092268 A1 * | 4/2014 | Cleveland | | 348/211.4 |
| 2014/0125660 A1 * | 5/2014 | Redmann | | 345/419 |

* cited by examiner

DISPLAY SYSTEM FOR STEREOSCOPIC VIEWING IMPLEMENTING SOFTWARE FOR OPTIMIZATION OF THE SYSTEM

RELATED APPLICATIONS

This application is a National Phase application of PCT/FR2007/052077, filed on Oct. 4, 2007, which in turn claims the benefit of priority from French Patent Application No. 06 54111, filed on Oct. 5, 2006, the entirety of which are incorporated herein by reference.

FIELD OF THE INVENTION

The present invention relates to a display system for stereoscopic viewing in three dimensions (3D).

The invention applies typically, but not exclusively, to 3D viewing of image or multimedia type information.

BACKGROUND

Document WO-2004/097462 proposes a binocular device for displaying information, the device comprising a support for placing on the nose and supporting a right display element and left display element, each designed to be placed in front of a corresponding eye and each including a light guide for receiving a beam of light rays emitted by a beam generator system towards an inlet face, propagating the beam, and delivering it through an outlet face where it is directed towards the corresponding eye.

The binocular display device also includes an arrangement for adjusting interpupillary distance, enabling the light guides to move relative to the support so as to adjust the distance between the light guides.

In a variant, the binocular device includes a subsystem for adjusting the focusing of the right and left images, enabling the display distances of the right and left images to be modified independently of each other.

The binocular display device is in communication with a simple display source and with a control interface.

By way of example, the display source may be a television, a DVD player, an MPEG4 player, or any other video image source.

A video signal is generated by the information data source and delivered to the control interface.

The control interface enables the user to adjust the contrast or the brightness of the image.

Nevertheless, that type of display system presents the drawback of not being optimized for the user of said display system, and it can quickly give rise to the user suffering dizziness and nausea.

That type of system is generally used with a relief effect that is overemphasized to the detriment of viewing comfort for the wearer of such a system.

OBJECTS AND SUMMARY

Thus, the technical problem to be solved by the subject matter of the present invention is to propose a display system for stereoscopic viewing that comprises a binocular viewing device, information content, and a display source enabling the problems of the state of the art to be avoided, in particular by enabling 3D information content to be viewed while limiting visual fatigue and discomfort for the user of said system, or in other words the wearer.

According to the present invention, the solution to the technical problem posed consists in that the display system further comprises electronic components for implementing software for optimizing the binocular viewing device, the information content, and the display source, said optimization software together forming a loop for managing the following parameters:

the interpupillary distance of a wearer, constituting an input parameter to the software for optimizing the binocular viewing device and the information content;

at least one output parameter from the software for optimizing the binocular viewing device, said output parameter being an input parameter to the software for optimizing the information content;

output parameters from the software for optimizing the information content, said output parameters being input parameters to the software for optimizing the display source; and output parameters from the software for optimizing the display source, said output parameters being input parameters to the software for optimizing the binocular viewing device;

said output parameters from the pieces of optimization software being adapted to the interpupillary distance of said wearer so that said wearer views the information content by means of the binocular viewing device under conditions that are best adapted to the wearer's physiology.

In the description below, the term "optimization software" designates one or more pieces of software of the executable, dll, or driver type.

The electronic components are well known to the person skilled in the art, and by way of example, they may be of the application specific integrated circuit (ASIC) type or of the electrically programmable read-only memory (EPROM) type.

The term "parameter management loop" designates a loop for transferring, storing, and/or processing parameters.

The invention as defined above presents the advantage of personalizing and thus of adapting the system specifically to each user, thereby making it possible to minimize or even eliminate any visual fatigue or discomfort.

Thus, the system of the invention provides stereoscopic vision presenting a relief effect and visual ergonomics that are optimized, so the user can use the system over a long period without suffering fatigue induced by failure to comply with the user's own visual physiology.

According to a characteristic of the invention, the wearer's ophthalmic correction is an additional input parameter to the software for optimizing the binocular viewing device, the output parameters from said software being adapted to said ophthalmic correction.

In a particularly advantageous embodiment, the binocular viewing device presents horizontal parallax that is less than 1.5° in absolute value.

In a variant, the horizontal parallax may be less than 1.2° in absolute value.

According to another characteristic of the invention, the binocular viewing device presents vertical parallax of less than 20'.

In an embodiment, an output parameter from the software for optimizing the binocular viewing device is the image display distance.

An additional output parameter from the software for optimizing the binocular viewing device may be the resolution of the screens.

In another embodiment, the output parameters of the information content are as follows:
the information content type;
the map of image disparity; and
the spatial frequency content of the images.

In a particular embodiment of the invention, when the information content is of a virtual content type, the wearer's interpupillary distance and/or the image display distance and/or the position and the orientation of the wearer's head may be input parameters to the software for optimizing the display source.

In another particular embodiment of the invention, when the information content type is real content filmed or acquired stereoscopically, the resolution of the images may be an additional output parameter from the software for optimizing the information content and/or the image display distance may be an input parameter to the software for optimizing the display source.

In another particular of the invention, when the information content type is real content that is not stereoscopic, the wearer's interpupillary distance and/or the image display distance are input parameters to the software for optimizing the display source.

Advantageously, the software for optimizing the display source includes spatial frequency filtering making use of the following input parameters to said software:
  the image disparity map; and
  the spatial frequency content of the images.

In another embodiment, the output parameters from the software for optimizing the display source are as follows:
  the distance of the mean rendering plane; and
  the inter-camera distance.

When the screen resolution is an additional output parameter from the software for optimizing the binocular viewing device, the resolution of the screens is an input parameter of the software for optimizing the display source, and the display resolution is an additional output parameter from the software for optimizing the display source.

In order to facilitate arranging the display system, the display source may include the software for optimizing the binocular viewing device, the information content, and the display source.

In a particular example, the display source is an appliance having a video reader and/or display function, said appliance being selected from: a computer, a games console, or a portable video player.

BRIEF DESCRIPTION OF THE DRAWINGS

Other characteristics and advantages of the present invention appear in the light of the description of a non-limiting example of a stereoscopic viewing system of the invention given with reference to the annotated figures, in which.

DETAILED DESCRIPTION

Figure 1:
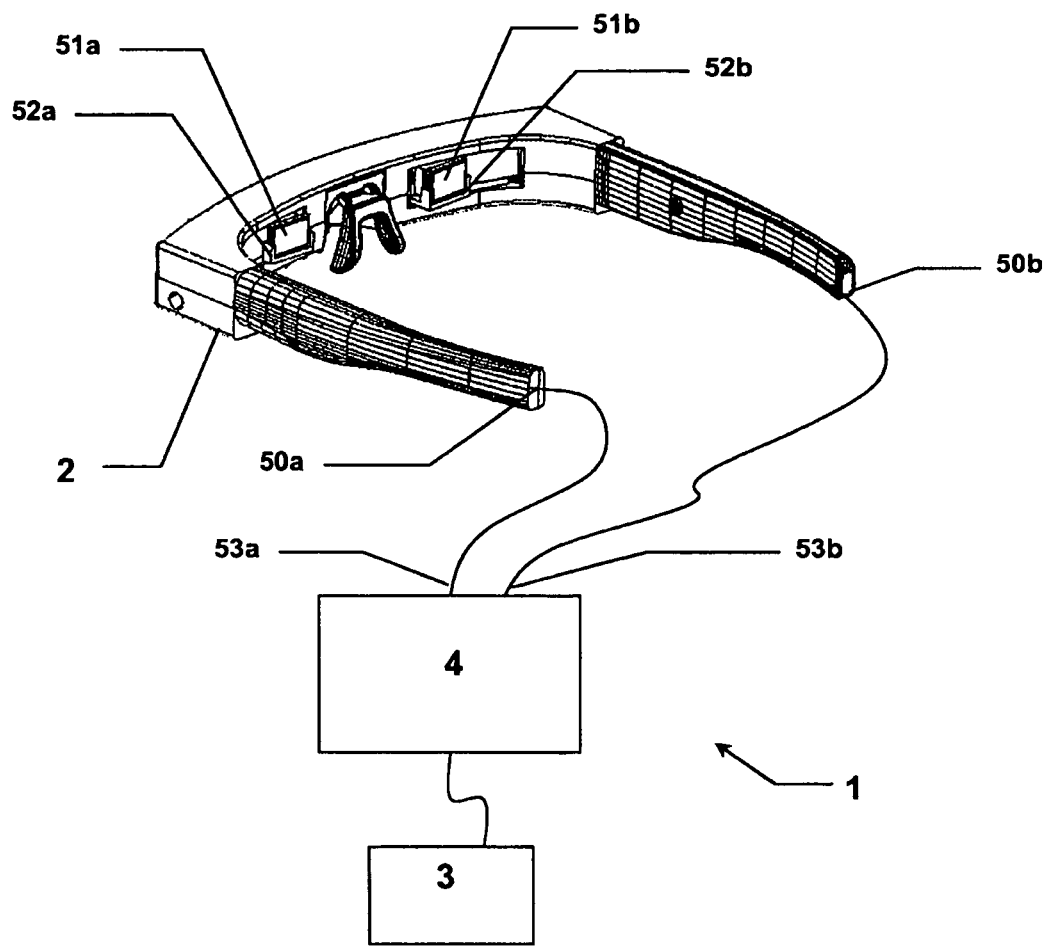
FIG. 1 is a diagrammatic view of a display system of the invention.

As shown in FIG. 1, the display system 1 of the invention comprises a binocular viewing device 2, information content 3, and a display source 4.

The binocular viewing device 2 is of the virtual reality goggles type specially adapted to stereoscopic viewing, having two video inputs 50a and 50b, and a system for adjusting to the interpupillary distance of the wearer.

Adjusting to the interpupillary distance of the wearer can be performed manually or under motor drive. It can perform a single symmetrical adjustment, or two independent adjustments, one for each eye, each adjustment then adjusting to a respective half-interpupillary distance.

In a variant, the binocular device 2 includes a subsystem for adjusting the focusing of the right and left images, enabling the display distances of the right and left images to be modified independently of each other.

Adjustment of the image focusing distance may be performed manually or under motor drive. It may enable a single adjustment to be performed symmetrically, or two independent adjustments to be performed, one for each of the image display distances.

Furthermore, vision correcting lenses 51a and 51b may be placed on U-shaped rails 52a and 52b if the user so desires.

The information content 3 may be presented in three aspects: content that is virtual; or content that is real and filmed or acquired stereoscopically; or else content that is real and not stereoscopic.

Virtual content results from modeling and a three-dimensional rendering engine.

It is like a model, a scene, or a virtual 3D world, where complete freedom is available concerning managing the scale of objects, minimum and maximum display distances, and the positions, the angles, and the distance between the cameras (themselves virtual) that generate the images for rendering.

This type of content is particularly advantageous since it enables the content to be optimized to the greatest possible extent concerning parameters relating to the binocular viewing device and to the display source.

Real content that is filmed or acquired stereoscopically is a type of real scene, i.e. filmed using stereoscopic cameras.

Two cameras with two lenses are thus needed for acquiring images, each of the cameras corresponding respectively to viewing with the right eye and to viewing with the left eye of an individual.

This type of content can be used when the distances between the cameras, the lenses, and their viewing angles are under control.

Real content that is not stereoscopic is content of the 2D type subjected to emulation to give a 3D effect. As a result it is difficult, a priori, to obtain a realistic 3D content.

Nevertheless, some pieces of software are available that enable right and left images to be created from a 2D image in order to obtain an equivalent stereoscopic image.

Such software makes use of image indices to deduce the relative positions of elements in depth.

By way of example, such indices may be light and shade produced on an object as a function of its volume, relative dimensions between objects, the way one object is interposed or occulted relative to another, the texture gradient of a surface, variation in the visibility of an outdoor scene, perspective, and parallax due to movements.

The software makes use of the parameters of the stereoscopic viewing system so that the recalculated images comply with optimum conditions for stereoscopic 3D viewing.

The display source 4 is an appliance serving to read and/or display video, and that is capable of performing computations.

Said appliance is preferably a computer, however it could also be a DVD reader, an MPEG4 player, or a portable or living-room console.

The display source in accordance with the invention has two distinct video outputs 53a and 53b so as to be capable of transmitting left and right images to the binocular viewing device 2.

These two outputs may be physically conveyed by a single cable if a separation system is used within the binocular viewing device 2.

As shown in FIG. 1, the display source 4 is connected to the binocular viewing device 2 and to the information content 3 by data transmission cables.

The two video outputs may also be connected by wireless, using a WiFi, Bluetooth 2, or other system.

The display system 1 includes software for optimizing the binocular viewing device 2, the information content 3, and the display source 4, where optimization is specific to the interpupillary distance of a wearer, such that said wearer views the information content 3 via the binocular viewing device 2 while minimizing physiological fatigue.

The wearer is defined by the wearer's interpupillary distance 11. Generally, the interpupillary distance 11 of the wearer is asymmetrical and needs to be subdivided into left and right half-distances in order to ensure that the display system of the invention is properly optimized.

These left and right half-distances of the interpupillary distance 11 of the wearer are respectively firstly the distance between the left orbit and the top of the wearer's nose, and secondly the distance between the right orbit and the top of the wearer's nose, the top of the nose and the left and right orbits being in alignment on a common axis.

The interpupillary distance 11 specific to each individual is easily determined by a competent person such as an optometrist or an optician.

The interpupillary distance 11 of the wearer may be adjusted manually and directly on the binocular viewing device 2 by a procedure that the wearer might possibly perform alone, or else indirectly by entering data into the interface fields of the display source 4, adjustment then taking place automatically by transmitting said interpupillary distance 11 to said binocular viewing device 2 on the basis of measurements made by a competent person.

Another parameter specific to the wearer is the wearer's ophthalmic correction 12.

By way of example, ophthalmic correction for the wearer may be obtained directly via the binocular viewing device by adding correcting lenses complying with a prescription from a competent person.

Another parameter specific to the wearer is the position and the orientation 13 of the wearer's head in a predefined frame of reference.

This parameter may be calculated in real time when using a system for tracking the position and the orientation of the head, said tracking system possibly being a system that is inertial, optical, or magnetic, for example.

Advantageously, this parameter is used when the information content is of the virtual content type, in particular a video game.

The parameters specific to the wearer, in particular interpupillary distance 11, are transmitted to the software for optimizing the binocular viewing device 2 and/or the information content 3 and/or the display source 4.

Any type of transmission means well known to the person skilled in the art can be used for forming the parameter management loop.

For example, when the interpupillary distance 11 of the wearer is adjusted directly on the binocular viewing device 2, it is stored in a flash-type memory provided specifically for this purpose. The interpupillary distance 11 stored in this way is then transmitted to the display source 4 by a wired or wireless type connection.

Figure 2:
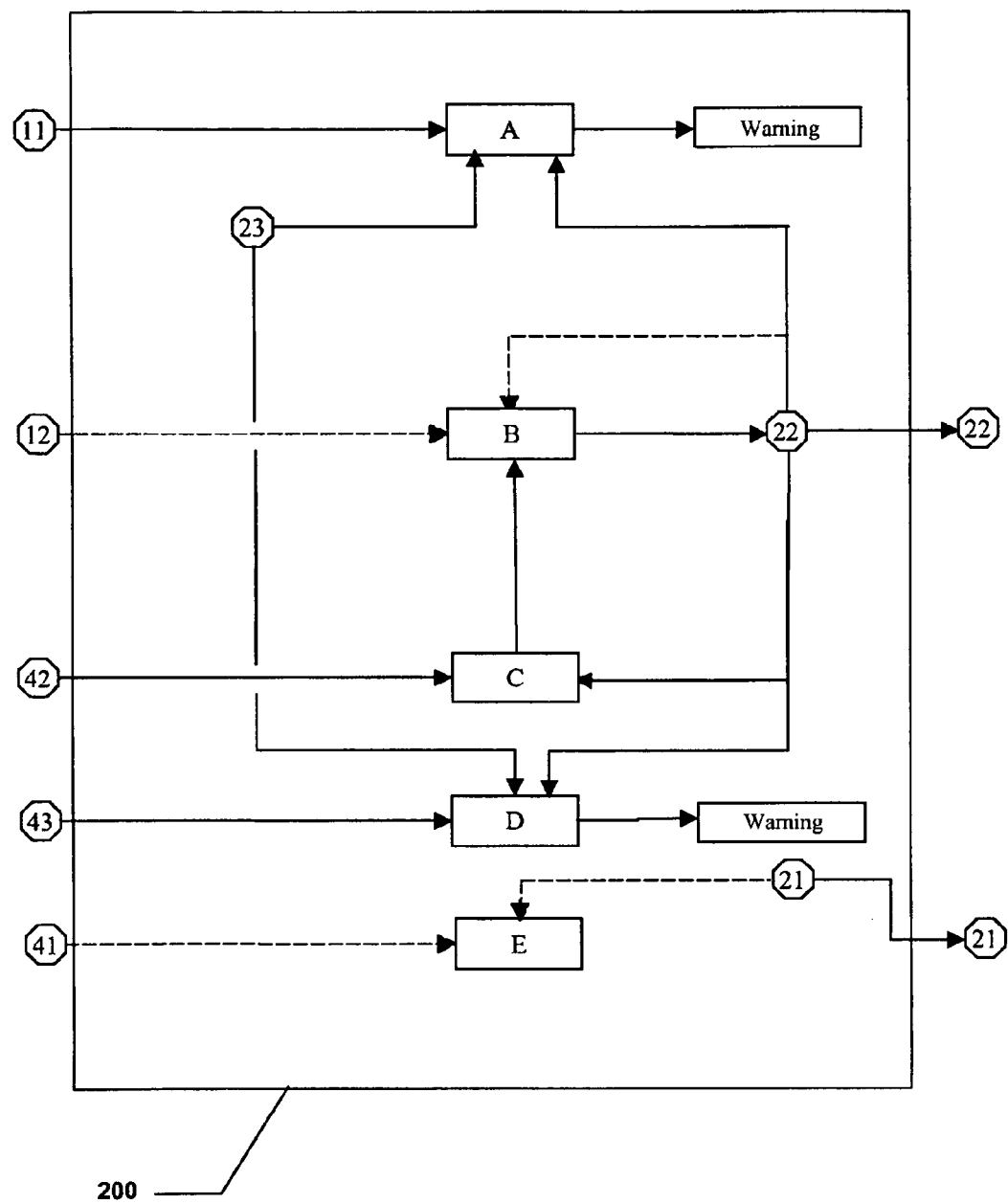
FIG. 2 is a flow chart of software for optimizing a binocular viewing device of a display system of the invention.
Figure 3:
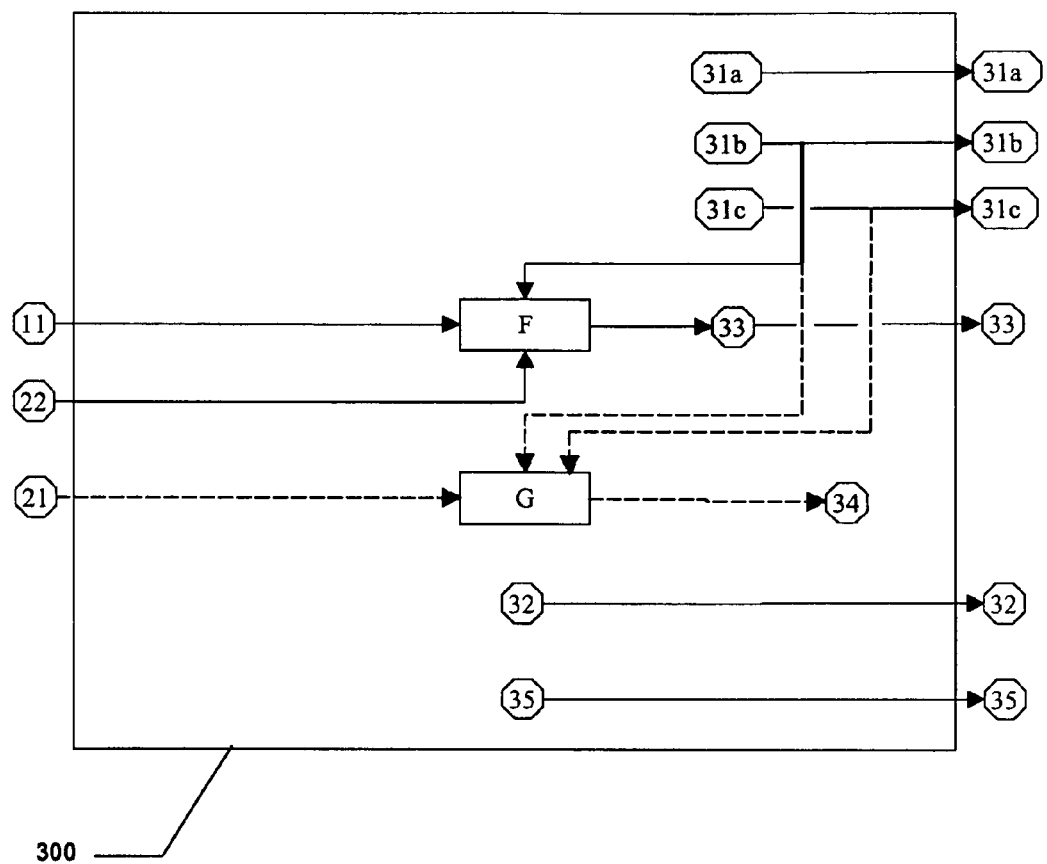
FIG. 3 is a flow chart of software for optimizing information content for a display system of the invention.
Figure 4:
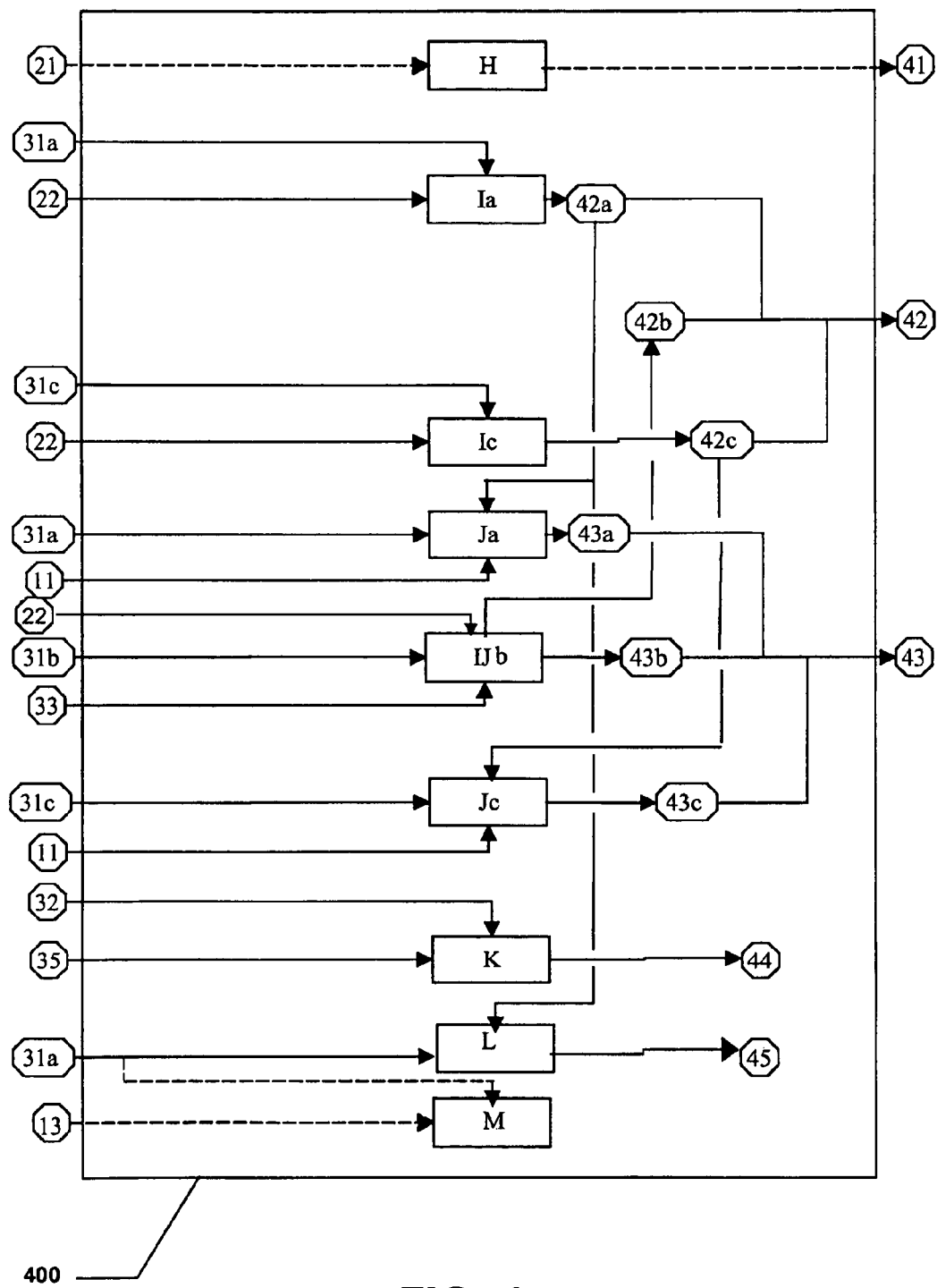
FIG. 4 is a flow chart of software for optimizing a display source of a display system of the invention.

FIGS. 2 to 4 show respectively: an example of a flow chart for the software 200 for optimizing the binocular viewing device 2; an example of a flow chart for the software 300 for optimizing the information content 3; and an example of a flow chart for the software 400 for optimizing the display source 4.

Said pieces of software 200, 300, and 400 together form a loop for managing parameters that is implemented in the stereoscopic viewing system in accordance with the invention.

They operate together to produce a right image and a left image that are viewed respectively by the right eye and by the left eye of the wearer.

References "A" to "M" in FIGS. 2 to 4 represent one or more steps in the computer processing of one or more parameters of the display system in accordance with the invention.

In FIG. 2, the software 200 for optimizing the binocular viewing device 2 deals with parameters specific to said binocular viewing device, namely:

the image display distance 22; and the interpupillary distance 23 of the binocular viewing device 2;

the vertical parallax of said binocular device 2 being less than 20'.

The image display distance 22 corresponds to the apparent distance of the image obtained after focusing by the binocular viewing device, and is thus not derived from parallax.

The interpupillary distance 11 of the wearer is incorporated in the binocular viewing device 2 by manual or automatic adjustment of the interpupillary distance 23 of the binocular viewing device 2.

More particularly, the left and right half-distances making up the interpupillary distance 11 of the wearer are incorporated in the binocular viewing device 2 by manual or automatic adjustment of the left and right half-distances of the interpupillary distance 23 of the binocular viewing device 2.

The software 200 for optimizing the binocular viewing device 2 also serves to handle various input parameters coming from the wearer and from the software 400 for optimizing the display source 4, namely:

the interpupillary distance 11 of the wearer;

the distance to the mean rendering plane 42; and the inter-camera distance 43.

It is considered that the wearer of the binocular viewing device 2 is an emmetropic wearer or an ametropic wearer with ophthalmic correction of the type comprising correcting eyeglasses, contact lenses, or correcting lenses positioned on said binocular viewing device 2.

The interpupillary distance 11 of the wearer and the interpupillary distance 23 of the binocular viewing device, and also the display distance 22 of the images are processed at A so as to guarantee a horizontal parallax Ph1 that is always less than 1.5° in absolute value.

Additional information concerning parallaxes is given in *Le traité de la réalité virtuelle tome* 1: "4.2.5.6 Les caractéristiques psychophysiques de la vision stéréoscopique" [*Treatise on virtual reality Volume* 1: "4.2.5.6 The psychophysical characteristics of stereoscopic vision"].

The horizontal parallax Ph1 of the binocular viewing device 2 is calculated using the following equation:

$$Ph1 = \left[ \begin{array}{c} \operatorname{atan}\left(\dfrac{IPDdevice\ 23Left}{\text{Image display distance 22}}\right) + \\ \operatorname{atan}\left(\dfrac{IPDdevice\ 23Right}{\text{Image display distance 22}}\right) \end{array} \right] - \left[ \begin{array}{c} \operatorname{atan}\left(\dfrac{IPDwearer\ 11Left}{\text{Image display distance 22}}\right) + \\ \operatorname{atan}\left(\dfrac{IPDwearer\ 11Right}{\text{Image display distance 22}}\right) \end{array} \right]$$

in which:

IDPdevice23Left represents the left half interpupillary distance of the binocular viewing device;

IDPdevice23Right represents the left half interpupillary distance of the binocular viewing device;

IDPwearer11Left represents the left half interpupillary distance of the wearer; and IDPwearer11Right represents the right half interpupillary distance of the wearer.

Under the best of circumstances, if the adjustment of the interpupillary distance 23 of the binocular viewing device is sufficiently accurate, then Ph1 is substantially close to zero assuming that the wearer is emmetropic or that the wearer is wearing not only the binocular viewing device 2, but also a correction system such as a pair of correcting eyeglasses, or contact lenses, or a pair of correcting lenses arranged on said binocular device.

When the horizontal parallax Ph1 is greater than 1.5° in absolute value, the interpupillary distance 23 of the binocular viewing device needs to be modified so as to obtain Ph1 that is less than 1.5° in absolute value.

This can happen, for example, when the adjustment for the interpupillary distance 11 of the wearer has not been properly set on the binocular viewing device 2.

The wearer then receives a warning stating that the conditions for optimum stereoscopic viewing that limit visual fatigue and discomfort are not satisfied.

If the binocular viewing device 2 has automatic adjustment of the interpupillary distance 23, then that adjustment is launched in order to bring the value of the interpupillary distance 23 stored in said binocular device 2 to the value of the interpupillary distance 11 of the wearer.

Once these two values are equal, the binocular device is considered as being adjusted.

Furthermore, with certain types of wearer, it may be preferable for the horizontal parallax Ph1 to be less than 1.2°.

The display distance 22 as modified in this way is processed at B, and is taken into account for optimizing various parameters by the software 200.

The distance of the mean rendering plane 42 of the display source and the image display distance 22 are processed at C.

The purpose of this processing is to obtain a display distance 22 that is equal to the distance of the mean rendering plane 42.

If the display distance 22 is different from the distance of the mean rendering plane 42, then its value is changed to that of the distance of the mean rendering plane 42.

Optionally, as represented in FIG. 2 by dashed-line arrows, the ophthalmic correction 12 of the wearer and also the image display distance 22 can be processed at B.

If the wearer of the binocular viewing device 2 has wrong ophthalmic correction 12, then the ophthalmic correction can be corrected indirectly by acting on the display distance 22 of the images.

Consequently, when the display distance 22 is at a distance that is not visible with the ophthalmic correction 12, of the wearer, the display distance 22 is modified.

The display distance 22 as modified in this way is processed at B and is also taken into account by the software 200 for optimizing various parameters.

Alternatively, in order to enable the wearer to see in focus, it is possible to use correcting lenses 51a and 51b without changing the display distance 22.

A warning message, e.g. an audible message, may remind the user to put the correcting lenses 51a and 51b properly into place.

The interpupillary distance 11 of the wearer is incorporated in the binocular viewing device 2 by a manual or automatic adjustment of the interpupillary distance 23 of the binocular viewing device 2.

The inter-camera distance 43 of the display source and the interpupillary distance 23 of the binocular viewing device, and also the display distance 22 of the images are processed at D in order to check the value of the horizontal parallax by calculating:

$$Ph2 = \left[ \begin{array}{c} \operatorname{atan}\left(\dfrac{\text{Inter-camera distance } 43Left}{\text{Image display distance 22}}\right) + \\ \operatorname{atan}\left(\dfrac{\text{Inter-camera distance } 43Right}{\text{Image display distance 22}}\right) \end{array} \right] - \left[ \begin{array}{c} \operatorname{atan}\left(\dfrac{IPDdevice\ 23Left}{\text{Image display distance 22}}\right) + \\ \operatorname{atan}\left(\dfrac{IPDdevice\ 23Right}{\text{Image display distance 22}}\right) \end{array} \right]$$

in which:

IPDdevice23Left represents the left interpupillary half-distance of the binocular viewing device;

IPDdevice23Right represents the right interpupillary half-distance of the binocular viewing device;

Inter-camera distance 43Left represent the left inter-camera half-distance of the display source; and Inter-camera distance 43Right represent the right inter-camera half-distance of the display source.

If the horizontal parallax Ph2 is greater than 1.5° in absolute value, the wearer receives a warning that conditions for optimum stereoscopic viewing that limit visual fatigue and discomfort are not satisfied.

Furthermore, the resolution of the right and left screens 21 is an additional parameter specific to the binocular viewing device 2 and that may be taken into account in the parameter management loop.

The display resolution 41 of the display source and the resolution of the screens 21 are processed at E.

When the display resolution 41 is greater than the resolution of the screens 21, the display resolution 41 is reduced so as to obtain resolution that is identical to that of the screens 21.

When the display resolution 41 is less than the resolution of the screens 21, the viewing system interpolates the images prior to displaying them by means of an interpolation filter, such that the display resolution 41 is identical to that of the screens 21.

Thus, the input parameters 11, 12, 41, 42, and 43 are processed by the optimization software 200 for the binocular viewing device 2 so as to obtain the parameters 21 and 22 at outputs from said software 200.

The management loop takes said output parameters 21 and/or 22 and delivers them to the software 300 for optimizing the information content 3 where they constitute input parameters for said software 300.

In FIG. 3, the software 300 for optimizing the information content 3 processes parameters specific to said information content, namely:
  the type of content, which may be virtual 31a or real, being filmed or acquired stereoscopically 31b, or else real, but not stereoscopic 31c;
  a map 32 of image disparities, i.e. the distribution of disparity between the images; and
  the spatial frequency content 35 of the images.

The software 300 for optimizing the information content 3 may also process various input parameters coming from the wearer and from the software 200 for optimizing the binocular viewing device 2, namely:
  the wearer's interpupillary distance 11; and
  the image display distance 22.

When the information content is of the stereoscopically-acquired or filmed real content type 31b, said content and the wearer's interpupillary distance 11 and the image display distance 22 are processed at F so as to determine the angle 33 between the two cameras specific to the information content 31b, by using the following equations:

$$\text{Angle 33 between the two cameras} = \frac{\text{Angle 33}Left + \text{Angle 33}Right}{}$$

$$\text{Angle 33 Left} = \operatorname{atan}\left(\frac{IPDwearer\ 11Left}{\text{Image display distance 22}}\right)$$

$$\text{Angle 33 Right} = \operatorname{atan}\left(\frac{IPDwearer\ 11Right}{\text{Image display distance 22}}\right)$$

where:
  IPDwearer 11Right is the right interpupillary half-distance of the wearer;
  IPDwearer 11Left is the left interpupillary half-distance of the wearer;
  Angle 33Left is the left sighting half-angle relative to the middle sighting axis, i.e. the axis perpendicular to the axis carrying the two cameras; and
  Angle 33Right is the right sighting half-angle relative to the middle sighting axis, i.e. the axis perpendicular to the axis carrying the two cameras.

Optionally, as represented in FIG. 3 by dashed lines, when the information content is of the real type whether stereoscopically-acquired or filmed 31b or non-stereoscopic 31c, said content and the resolution of the screens 21 are processed at G in order to obtain an image resolution 34 specific to the information content 31b or 31c that is equal to the resolution of the screens 21.

As a result, the size of the information content images is optimized and the images can be processed faster in the stereoscopic viewing system.

Thus, the input parameters 11, 21, and 22 are processed by the software 300 for optimizing the information content 3 so as to obtain as outputs from said software 300 the parameters 32, 33, 35, and 31a, 31b, or 31c depending on the type of content.

The management loop takes said output parameters 31a, 31b, 31c, 32, 33, and/or 35 and delivers them to the software 400 for optimizing the display source 4 as input parameters to said software 400.

In FIG. 4, the software 400 for optimizing the display source 4 processes the various input parameters coming from the wearer 1, from the software 200 for optimizing the binocular viewing device 2, and from the software 300 for optimizing the information content 3, namely:
  the information content type which may virtual 31a, or stereoscopic real 31b, or non-stereoscopic real 31c;
  the image disparity map 32; and
  the spatial frequency content 35 of the images; and, depending on the information content type:
  the wearer's interpupillary distance 11;
  the image display distance 22; and
  the angle 33 between the two cameras.

When the information content is of the virtual content type 31a, said content 31a and the image display distance 22 are processed at Ia in order to obtain a mean rendering plane distance 42a specific to the display source 4.

Thus, to set the parameters of the virtual cameras used for displaying the images from the virtual content 31a, the distance of the mean rendering plane 42a is equal to the display distance 22.

When the information content is of the stereoscopically-acquired or filmed real content type 31b, said content 31b, the angle 33 between the two cameras, and the image display distance 22 are processed at IJb in order to obtain a distance for the mean rendering plane 42b and an inter-camera distance 43b that are specific to the display source 4.

Thus, to generate the left and right images, the distance of the mean rendering plane 42b is equal to the display distance 22.

The angle 33 between the two cameras makes it possible to use the distance of the mean rendering plane 42b to deduce the inter-camera distance 43b using the following equation:

Inter-camera distance 43b=tan(Angle33)*Distance of the mean rendering plane 42b

More particularly, when the wearer's interpupillary distance 11 is asymmetrical, the angle 33 is resolved into two half-angles, one on the left and one on the right, and the inter-camera distance 43b is resolved into two inter-camera half-distances one on the left and one on the right.

Thus, the equation for the inter-camera distance 43b becomes:

Inter-camera distance 43b=Inter-camera distance 43bLeft+Inter-camera distance 43bRight where:

Inter-camera distance 43bLeft=tan(Angle 33Left) *Distance of the mean rendering plane 42b Inter-camera distance 43bRight=tan(Angle 33right) *Distance of the mean rendering plane 42b It is therefore necessary to comply with an overall proportionality factor, which is weighted as a function of any asymmetry in the wearer's interpupillary distance between the distance of the mean rendering plane 42b and the inter-camera distance 43b.

This implies adjusting both parameters 42b and 43b simultaneously and systematically. By way of example, this adjustment is performed at the lenses at each of the two cameras for the distance of the mean rendering plane 42b.

When the information content is of the non-stereoscopic real content type 31c, said content 31c and the image display distance 22 are processed at Ic so as to obtain a distance of the mean rendering plane 42c that is specific to said content 31c.

Thus, in order to generate the left and right images, the distance of the mean rendering plane 42c is equal to the display distance 22.

The virtual content 31a together with the wearer's interpupillary distance 11 and the distance of the mean rendering plane 42a are processed at Ja in order to obtain an inter-camera distance 43a specific to the display source 4.

Thus, in agreement with the distance of the mean rendering plane 42a in order to satisfy the condition for horizontal parallax being less than 1.5° in absolute value, the left and right inter-camera distances 43a of the display source are equal to the wearer's interpupillary distance 11, with the following tolerance:

$$\left| \begin{bmatrix} \operatorname{atan}\left(\frac{\text{Inter-camera distance } 43aLeft}{\text{Distance of the mean rendering plane } 42a}\right) + \\ \operatorname{atan}\left(\frac{\text{Inter-camera distance } 43aRight}{\text{Distance of the mean rendering plane } 42a}\right) \end{bmatrix} - \begin{bmatrix} \operatorname{atan}\left(\frac{IPDwearer\ 11Left}{\text{Distance of the mean rendering plane } 42a}\right) + \\ \operatorname{atan}\left(\frac{IPDwearer\ 11Right}{\text{Distance of the mean rendering plane } 42a}\right) \end{bmatrix} \right| < 1.5°$$

The non-stereoscopic real content 31c together with the wearer's interpupillary distance 11 and the distance of the mean rendering plane 42c are processed at Jc in order to obtain the inter-camera distance 43c of the display source specific to said content 31c.

Thus, in agreement with the distance of the mean rendering plane 42c in order to satisfy the condition of horizontal parallax less than 1.5° in absolute value, the left and right inter-camera distances 43c of the display source are equal to the wearer's interpupillary distance 11, with the following tolerance:

$$\left| \begin{bmatrix} \operatorname{atan}\left(\frac{\text{Inter-camera distance } 43cLeft}{\text{Distance of the mean rendering plane } 42a}\right) + \\ \operatorname{atan}\left(\frac{\text{Inter-camera distance } 43cRight}{\text{Distance of the mean rendering plane } 42a}\right) \end{bmatrix} - \begin{bmatrix} \operatorname{atan}\left(\frac{IPDwearer\ 11Left}{\text{Distance of the mean rendering plane } 42a}\right) + \\ \operatorname{atan}\left(\frac{IPDwearer\ 11Right}{\text{Distance of the mean rendering plane } 42a}\right) \end{bmatrix} \right| < 1.5°$$

The map of image disparity 32 together with the parameter of the spatial frequency content 35 of the images are processed at K so as to obtain a filtered spatial frequency content 44 specific to the display source 4.

The filtering algorithm serves to filter the spatial frequencies so as to obtain a frequency content 44 that is less tiring than the frequency content 35, this type of filtering serving to decrease effects that result from the absence of a plurality of focal planes in the stereoscopic display system. This decreases fatigue due to accommodation-convergence conflicts.

This type of algorithm is well known to the person skilled in the art and serves to limit visual fatigue either by masking points where spatial frequencies and disparities are not compatible, or by truncating the spatial frequency content at high frequencies in order to make it easier to fuse images.

Examples of frequency filter methods are described in *Le traité de la réalité virtuelle tome* 1: "10.6.4.2 Méthodes par filtrages fréquentiels" [*Treatise on virtual reality Volume* 1: "10.6.4.2 Methods by frequency filtering"].

The virtual content 31a together with the distance of the mean rendering plane 42a are processed at L so as to obtain a display distance 45 specific to the display source 4.

Said display distance 45 lies between a minimum display distance and a maximum display distance.

These minimum and maximum distances need to comply with the conditions for displaying Panum's area.

Panum's area, described in the *Le traité de la réalité virtuelle tome* 1: "4.2.4.2 Convergence et disparité rétinienne" and "4.2.4.3 Stéréopsie et diplopie" [*Treatise on virtual reality Volume* 1: "4.2.4.2 Convergence and retinal disparity" and "4.2.4.3 Stereopsis and diplopia"] correspond to the region of space that enables vision to be stereoscopic with the left and right images fusing.

The processing at L is performed using as the midplane the distance 42a obtained by the processing Ia in order to determine the display latitude in front of and behind said plane, given the displayed content and complying with the conditions for Panum's area.

Thus, for a distance that is less than the minimum distance, the device does not display any virtual content information 31a, and the same applies for a distance greater than the maximum distance.

The processing also implies possible modification of the display scale of the virtual content 31a so that the displayed scene complies with the minimum and maximum display distances. This amounts to setting parameters of the virtual cameras used for displaying the virtual content 31a (changing their focal lengths).

Optionally, as represented in FIG. 4 by dashed-line arrows, the resolution of the screens 21 specific to the binocular viewing device 2 may be processed at H in order to obtain a display source adapted to the binocular viewing device so as to have the display resolution 41 of the display source 4 equal to the resolution of the screens 21.

Furthermore, when the information content is of the virtual content type 31a, said content 31a and the position and the orientation 13 of the wearer's head may be processed at M so as to obtain a position for the midpoint between the cameras and sighting directions for the sighting axes of the two virtual cameras.

The processing at M serves in real time to make the position of the cameras and their mid-sighting angle correspond to the data concerning the position and the orientation 13 of the wearer's head while the wearer is moving in the frame of reference defined in the virtual content 31a.

Thus, the input parameters 31a, 31b, or 31c depending on the content type, and 11, 13, 21, 22, 32, 33, and 35 are processed by the software 400 for optimizing the display source 4 so as to obtain parameters 41, 42, and 43 at the output from said software 400.

The management loop takes said output parameters 41, 42, and/or 43 and conveys them to the software 200 for optimizing the binocular viewing device 2 as input parameters for said software 200.

Figure 5:
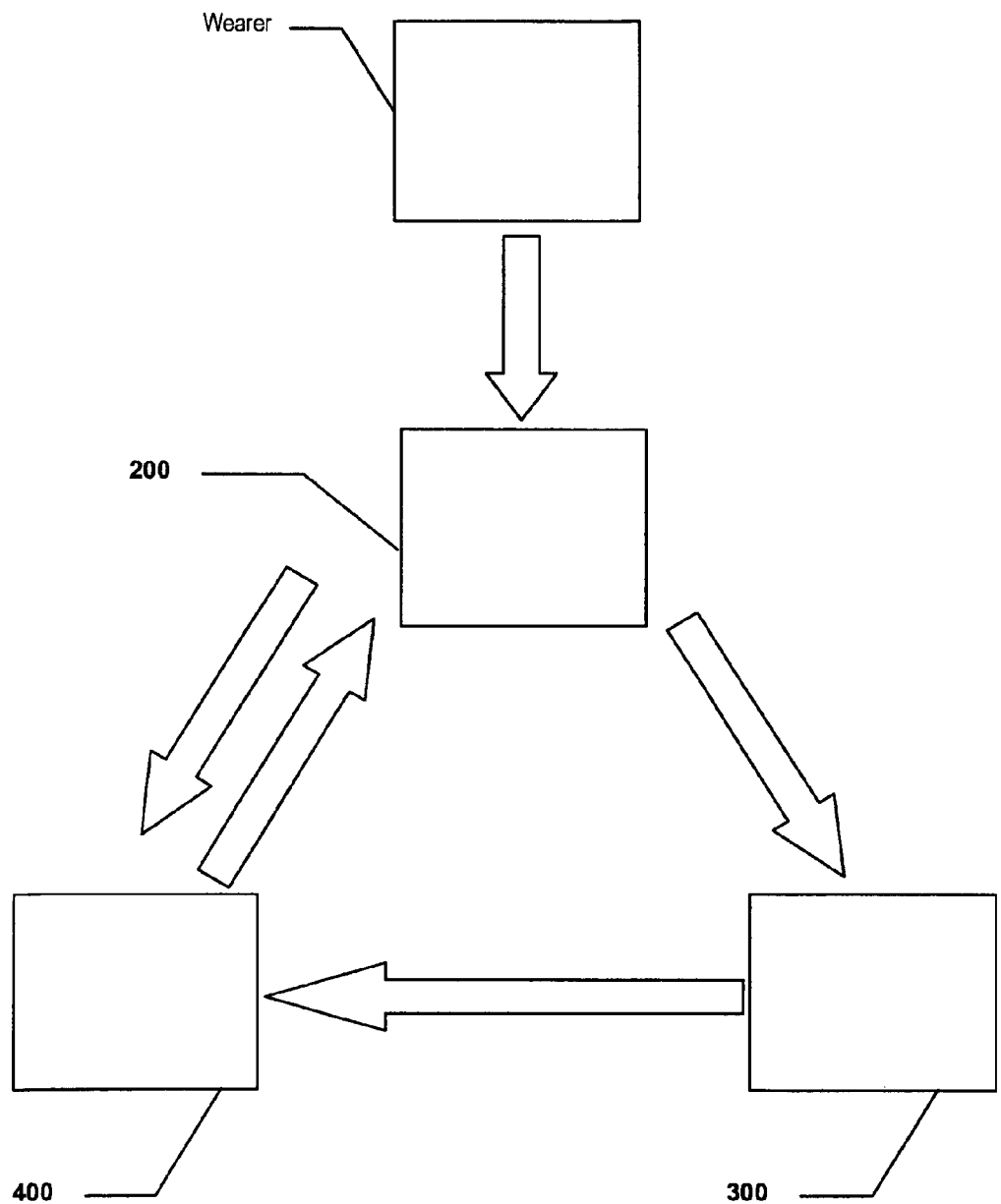
FIG. 5 shows a parameter management loop formed by the pieces of optimization software of the invention as shown in FIGS. 2 to 4.

FIG. 5 shows an example parameter management loop made up of the pieces of optimization software in accordance with the invention as represented by FIGS. 2 to 4.

At least one parameter specific to the wearer and needed by the parameter management loop is stored, for example, in the software 200 for optimizing the binocular device and is transferred to the software 300 and/or the software 400 as input parameters, possibly depending on the type of information content.

The output parameters from the software 200 are transferred as input parameters to the software 300 where they are processed by said software 300.

The output parameters from the software 300 are transferred as input parameters to the software 400 and they are processed by said software 400.

The output parameters from the software 400 are transferred as input parameters to the software 200 and are processed by said software 200.

In another variant, the parameter(s) specific to the wearer as needed in the parameter management loop, may be stored for example in the software 300 for optimizing the information content and may be transferred to the software 200 and/or to the software 400 as input parameters optionally depending on the information content type.

Or indeed, the parameter(s) specific to the user and needed by the parameter management loop may be stored for example in the software 400 for optimizing the display source and may be transferred to the software 200 and/or to the software 300 as input parameters optionally depending on the information content type.

The present invention is not limited to the example implementation described above and bears more generally on any stereoscopic viewing system that can be envisaged on the basis of the general indications given in the description of the invention.

In particular, the pieces of software 200, 300, and 400 for optimizing the binocular viewing device 2, the information content 3, and the display source 4, respectively, may be integrated together in the display source 4, which is of the computer type.

The invention claimed is:

1. A display system for stereoscopic viewing, the system comprising:
a binocular viewing device;
information content chosen between a virtual content, a real and filmed content or stereoscopically acquired information content, and a real and not stereoscopic content; and
a display source to read and/or display video;
said system further comprising electronics components for implementing software for optimizing the binocular viewing device, the information content, and the display source, said optimization software together forming a loop for managing the following parameters:
the interpupillary distance of a wearer, constituting an input parameter to the software for optimizing the binocular viewing device and the information content and the display source;
an image display distance which is an output parameter from the software for optimizing the binocular viewing device, and which is an input parameter to the software for optimizing the information content, said image display distance and the interpupillary distance being processed by the software for optimizing the binocular viewing device so as to guarantee a horizontal parallax that is always less than 1.5° in absolute value,
the virtual information content, the real and filmed or stereoscopically acquired information content and the real and not stereoscopic information content, a map of image disparities and a spatial frequency content, which constitute output parameters from the software for optimizing the information content and which constitute input parameters to the software for optimizing the display source, the real and filmed or stereoscopically acquired information content, the interpupillary distance of the wearer and the image display distance being processed by the software for optimizing the information content so as to determine the angle between two cameras specific to the filmed or stereoscopically acquired information content,
a distance of the rendering plane and minter-camera distance which constitute output parameters from the software for optimizing the display source, and which constitute input parameters to the software for optimizing the binocular viewing device, the distance of the rendering plane being processed by the software for optimizing the binocular viewing device so as to be equal to the image display distance;
said output parameters from the pieces of optimization software being adapted to the interpupillary distance of said wearer so that said wearer views the information content by means of the binocular viewing device under conditions that are best adapted to the wearer's physiology in order to minimize or even eliminate visual fatigue or discomfort.

2. A system according to claim 1, wherein the horizontal parallax that is less than 1.2° in absolute value.

3. A system according to claim 1, wherein the image display distance is an input parameter to the software for optimizing the display source.

4. A system according to claim 1, wherein the position and the orientation of the wearer's head is an input parameter to the software for optimizing the display source.

5. A system according to claim 1, wherein the resolution of the images is an additional output parameter from the software for optimizing the information content.

6. A system according to claim 1 wherein the software for optimizing the display source includes spatial frequency filtering making use of the following input parameters to said software: the image disparity map, and the spatial frequency content of the images.

7. A system according to claim 1, wherein the wearer's ophthalmic correction is an additional input parameter to the software for optimizing the binocular viewing device, the output parameters from said software being adapted to said ophthalmic correction.

8. A system according to claim 1, wherein an additional output parameter from the software for optimizing the binocular viewing device is the resolution of the screens.

9. A system according to claim 7, wherein the resolution of the screens is an input parameter of the software for optimizing the display source.

10. A system according to claim 1, wherein the display resolution is an additional output parameter from the software for optimizing the display source.

11. A system according to claim 1, wherein the binocular viewing device presents vertical parallax of less than 20'.

12. A system according to claim 1, wherein the display source includes the software for optimizing the binocular viewing device, the information content, and the display source.

13. A system according to claim 1, wherein the display source is an appliance having a video read and/or display function, said appliance being selected from the group consisting of a computer, a games console and a portable video player.

* * * * *